Figure 1:
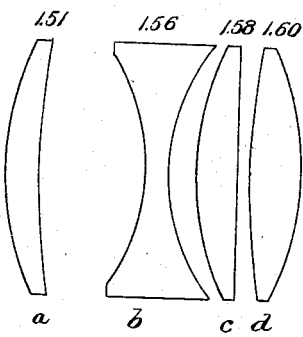

No. 660,747. Patented Oct. 30, 1900.
E. BAUSCH.
OBJECTIVE.
(Application filed May 31, 1900.)

(No Model.)

Witnesses:
G. Willard Rich.
Thomas Durant

Inventor,
Edward Bausch
by Church & Church
his Attorneys.

THE NORRIS PETERS CO., PHOTO-LITHO., WASHINGTON, D. C.

UNITED STATES PATENT OFFICE.

EDWARD BAUSCH, OF ROCHESTER, NEW YORK, ASSIGNOR TO THE BAUSCH & LOMB OPTICAL COMPANY, OF SAME PLACE.

OBJECTIVE.

SPECIFICATION forming part of Letters Patent No. 660,747, dated October 30, 1900.

Application filed May 31, 1900. Serial No. 18,604. (No model.)

*To all whom it may concern:*

Be it known that I, EDWARD BAUSCH, of Rochester, in the county of Monroe and State of New York, have invented certain new and useful Improvements in Objectives; and I do hereby declare the following to be a full, clear, and exact description of the same, reference being had to the accompanying drawings, forming a part of this specification, and to the reference characters marked thereon.

The object of my invention is the production of lenses for photographic or projection purposes having a high degree of correction for the spherical, chromatic, and astigmatic aberrations by more simple means than have prevailed heretofore.

It is a well-known fact that the light-giving properties or so-called "speed" in a photographic objective depends upon the size of its opening (diaphragm) and the light-transmitting properties of the several lenses of which it is composed. The mere quality of speed in an objective has little value unless it is accompanied by freedom from spherical, chromatic, and astigmatic errors, and to accomplish this end an aggregation of lenses have been required, ranging as high as ten lenses in one objective. It follows that the larger number of lenses involve loss of light by absorption, add weight, and increase cost. It is also customary to make some of the lenses of considerable thickness and to use several dispersing and collecting lenses in one combination. The dispersing-lenses are generally of flint-glass of considerable density, which absorbs more light and is more susceptible to atmospheric influence than is the case in crown-glass. Having these difficulties in mind, I have constructed a lens composed of only four members, one of them only being a dispersing-lens composed of flint-glass, the others being crown-glass (collecting-lenses) of different refractive indices and all of them being relatively thin and so designed as to be free from spherical, chromatic, and astigmatic errors and having relatively great speed. The several members may be of different curvatures and may be separated by an air-space or may be cemented together. However, I prefer to separate them in order that corrections for spherical and astigmatic errors may be made, which would be difficult of accomplishment in such a high degree if the elements were cemented.

Figure 2:
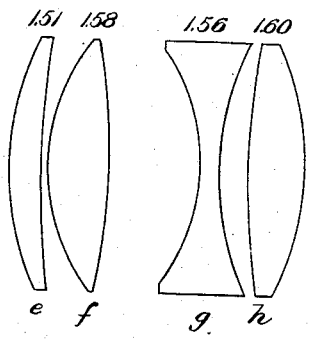
Figure 3:
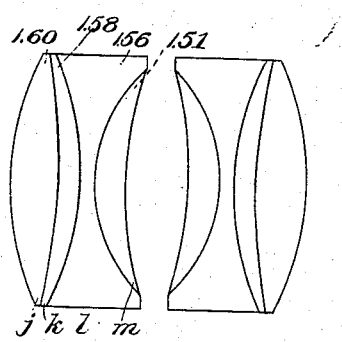

In the drawings, Figures 1, 2, and 3 show sectional views of different forms of objectives constructed in accordance with my invention.

Referring particularly to Fig. 1, the objective is composed of one member or lens on one side of the usual space provided for the diaphragm and three on the other, the single lens $a$ being positive or collective and composed of crown-glass and in the present instance having a refractive index of, say, 1.51, while the positive members $c$ and $d$ are each composed of crown-glass, the former having a refractive index of, say, 1.58 and the latter having a relatively higher index, say 1.60. The single negative or dispersive lens $b$ is composed of flint-glass having a refractive index which is higher than that of the positive lens having the lowest index and lower than that of the positive lens having the highest and is different from the index of the remaining positive lens. In the present arrangement the refractive index of the lens $b$ is 1.56 or between 1.60 and 1.58; but this I do not regard as essential, as it might be 1.54 for instance.
In Fig. 2 I have shown another form of objective embodying my improvements, in which the members are arranged in systems composed of pairs separated by air-spaces, the lenses $e$ and $f$ being of crown-glass having indices of 1.51 and 1.58, respectively, and the other pair being composed of the negative lens $g$, of flint, with an index of, say, 1.56, and the positive crown-lens $h$ having an index of, say, 1.60.

In Fig. 3 is shown still another form of objective embodying two similar systems, each embodying lenses having the characteristics of the other forms, excepting that their curvatures are so related that they may be and are preferably cemented together. In this embodiment the positive or collective lens $j$, of crown-glass, has a refractive index of 1.60, the lens $k$ of 1.58, and the third positive lens $m$ one of 1.51, while the negative lens $l$, of flint-glass, has an index of 1.56.

The various curvatures of the lenses of all the forms are so related as to give the desired focus to the objective and correct the spherical, chromatic, and astigmatic variations in the manner well known to those skilled in the art.

I claim as my invention—

1. An objective composed of four lenses having different curvatures, three of said lenses being positive and each having different refractive indices, and the fourth lens being negative and having a refractive index lying between that of the positive lens having the lowest index and either of the other positive lenses.

2. An objective composed of four separated lenses having different curvatures, three of said lenses being positive and each having different refractive indices, and the fourth lens being negative and having a refractive index lying between that of the positive lens having the lowest index and either of the other positive lenses.

3. An objective composed of four lenses, one of which is negative, the other three being positive, the refractive index of one of the positive lenses being higher and that of another being lower than the index of the negative lens, and the refractive index of the third positive lens lying between that of the positive lens having the highest index and that of the negative lens.

EDWARD BAUSCH.

Witnesses:
G. A. RODA,
G. WILLARD RICH.